United States Patent [19]

Miyazawa et al.

[11] Patent Number: 4,729,847

[45] Date of Patent: Mar. 8, 1988

[54] OPTICALLY ACTIVE LIQUID CRYSTAL COMPOUND HAVING METHYLENEOXY GROUP AND COMPOSITION CONTAINING SAME

[75] Inventors: Kazutoshi Miyazawa; Hiromichi Inoue; Takashi Inukai; Kanetsugu Terashima, all of Yokohamashi, Japan

[73] Assignee: Chisso Corporation, Osaka, Japan

[21] Appl. No.: 889,093

[22] Filed: Jul. 10, 1986

[30] Foreign Application Priority Data

Jul. 26, 1985 [JP] Japan .................. 60-165564

[51] Int. Cl.$^4$ .................. G02F 1/13; C09K 19/20; C07C 69/76
[52] U.S. Cl. .................. 252/299.64; 252/299.01; 252/299.5; 252/299.6; 252/299.67; 350/350 S; 560/55; 560/73; 560/105; 560/107; 560/108
[58] Field of Search ......... 252/299.5, 299.64, 299.67, 252/299.01, 299.6, 299.66; 350/350 R, 350 S; 560/73, 55, 105, 107, 108

[56] References Cited

U.S. PATENT DOCUMENTS

| | | | |
|---|---|---|---|
| 4,257,911 | 3/1981 | Gray et al. | 252/299.65 |
| 4,576,732 | 3/1986 | Isogai et al. | 252/299.67 |
| 4,596,667 | 6/1986 | Inukai et al. | 252/299.67 |
| 4,613,209 | 9/1986 | Goodby et al. | 252/299.01 |
| 4,668,427 | 5/1987 | Saito et al. | 252/299.6 |

FOREIGN PATENT DOCUMENTS

| | | | |
|---|---|---|---|
| 61-255988 | 11/1986 | Japan | 252/299.6 |
| 2092169 | 8/1982 | United Kingdom | 252/299.61 |

OTHER PUBLICATIONS

Tinh, N. H. et al., Mol. Cryst. Liq. Cryst., vol. 53, pp. 43–54 (1979).
Bezborodov, V. S. et al., Zh. Org. Khim., vol. 20 (9), pp. 1913–1915 (Russ.), 1745–1747 (Eng) (Sep. 1984).
Tinh, N. H. et al., Mol. Cryst. Liq. Cryst., vol. 92 (Letters), pp. 257–262 (1984).
Goodby, J. W. et al., Liquid Crystals and Ordered Fluids, vol. 4, Plenum Press, N.Y., pp. 1–32 (1984).
Gray, G. W. et al., Liquid Crystals & Plastic Crystals, vol. 1, John Wiley & Sons, Inc., N.Y., pp. 142, 143.

Primary Examiner—Teddy S. Gron
Attorney, Agent, or Firm—Wenderoth, Lind & Ponack

[57] ABSTRACT

A novel, superior, optically active liquid crystal compound exhibiting a smectic C* phase, and a liquid crystal composition containing the same are provided, which compound is expressed by the formula

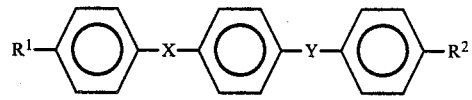

wherein X represents —CH$_2$O— or —OCH$_2$—; Y represents —COO— or —OCO—; and either one of R$^1$ or R$^2$ represents an optically active alkyl group, alkoxy group or alkoxycarbonyl group and the other represents a non-optically-active alkyl group or alkoxy group each of 4 to 18 carbon atoms.

10 Claims, No Drawings

OPTICALLY ACTIVE LIQUID CRYSTAL COMPOUND HAVING METHYLENEOXY GROUP AND COMPOSITION CONTAINING SAME

BACKGROUND OF THE INVENTION

1. Field of the Invention

This invention relates to a novel liquid crystal substance and a liquid crystal composition containing the same. More particularly it relates to a chiral liquid crystal substance having an optically active group and a chiral liquid crystal composition containing the same.

2. Description of the Prior Art

At present, as to liquid crystal display elements, TN (Twisted Nematic) type display mode has been most broadly employed, but as far as the response speed is concerned, such TN type display elements are inferior to emissive type display elements (such as those of electroluminescence, plasma display, etc.). Although various improvements in this respect have been attempted, it appears that the possibility of improvement to a large extent has not been realized. Thus, various liquid crystal display devices based on a different principle from that of TN type display elements have been attempted. As one of such devices, there is a display mode utilizing a ferroelectric liquid crystal (N. A. Clark et al: Applied Phys. lett., 36, 899 (1980)). This mode utilizes the chiral smectic C phase (hereinafter abbreviated to SC* phase) or the chiral smectic H phase (hereinafter abbreviated to SH* phase) of the ferroelectric liquid crystal, and those having these phases in the vicinity of room temperature are preferred.

SUMMARY OF THE INVENTION

Mainly in order to develop a liquid crystal substance which is more suitable to be used in this display mode and has superior specific features, the present inventors have extensively searched for a liquid crystal substance having an optically active group, and have attained the present invention.

The present invention resides in an optically active liquid crystal compound expressed by the formula

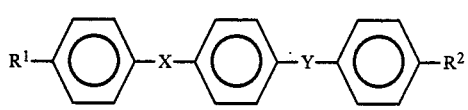
(I)

wherein X represents —CH$_2$O— or —OCH$_2$—; Y represents —COO— or —OCO—; and either one of R$^1$ or R$^2$ represents an optically active alkyl group, alkoxy group or alkoxycarbonyl group and the other represents a non-optically-active alkyl or alkoxy group each of 4 to 18 carbon atoms, and a chiral liquid crystal composition containing the same.

DETAILED DESCRIPTION OF PREFERRED EMBODIMENTS

Concrete examples of the compounds of the formula (I) of the present invention are as follows:

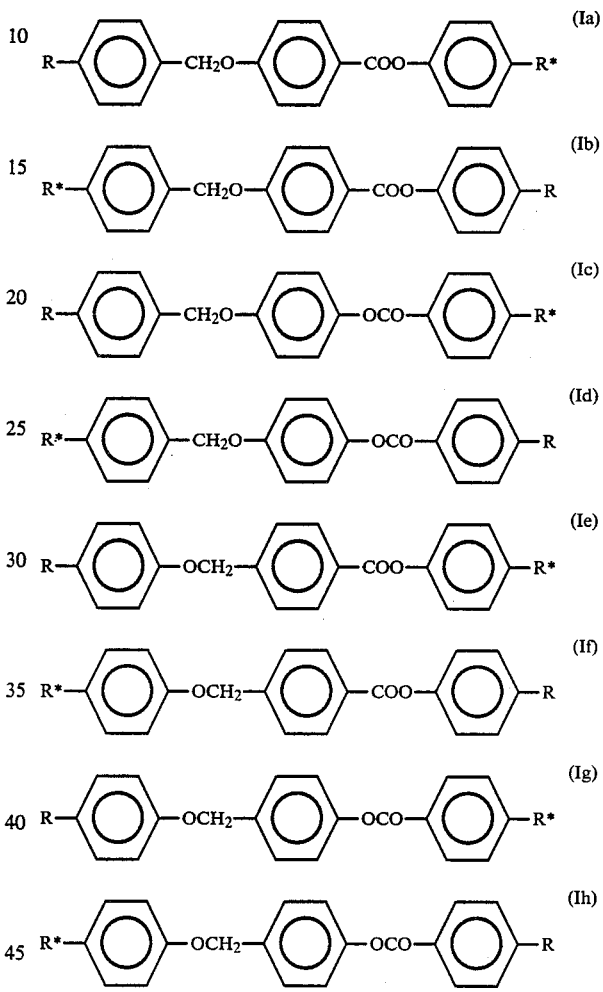

In the above formulas, R* indicates the case where R$^1$ or R$^2$ in the formula (I) is an optically active group and R indicates the case where R$^1$ or R$^2$ is a non-optically-active group.

The phase transition temperatures, spontaneous polarization values and tilt angles of representatives of these compounds are shown in Table 1 and Table 2.

TABLE 1

| Sample No. | In formula (I) X | Y | R$^1$ | R$^2$ | Formula | Phase transition point (°C.)*1 C | SI* | SB | SC* | SA | Ch | I | Note |
|---|---|---|---|---|---|---|---|---|---|---|---|---|---|
| 1 | —CH$_2$O— | —COO— | C$_7$H$_{15}$O— | CH$_3$<br>\|<br>—OCH$_2$CHC$_2$H$_5$<br>* | Ia | • 118.4 | — | — | • 125.9 | • 140.0 | — | • | Example 1 |
| 2 | " | " | C$_8$H$_{15}$O— | " | Ia | • 120.7 | — | — | • 129.0 | • 140.8 | — | • | |
| 3 | " | " | C$_{10}$H$_{21}$O— | " | Ia | • 107.8 | — | — | • 132.1 | • 138.6 | — | • | |
| 4 | " | " | C$_{12}$H$_{25}$O— | " | Ia | • 95.0 | — | — | • 118.0 | • 127.0 | — | • | |

TABLE 1-continued

| Sample No. | In formula (I) X | Y | R¹ | R² | Formula | Phase transition point (°C.)*¹ C | SI* | SB | SC* | SA | Ch | I | Note |
|---|---|---|---|---|---|---|---|---|---|---|---|---|---|
| 5 | " | " | $C_{10}H_{21}O-$ | $CH_3$<br>$\mid$<br>$-OCHC_6H_{13}$<br>$*$ | Ia | • 85.9 | — | — | • 105.3 | — | — | • | |
| 6 | " | " | $C_{12}H_{25}O-$ | " | Ia | • 77.2 | — | — | • 102.5 | — | — | • | |
| 7 | " | " | $CH_3$<br>$\mid$<br>$C_6H_{13}CHO-$ | $-OC_5H_{11}$ | Ib | • 105.2 | — | — | (• 91.0) | — | •92.9) | • | |
| 8 | " | " | " | $-OC_8H_{17}$ | Ib | • 106.0 | — | — | (• 97.1) | — | — | • | |
| 9 | " | " | " | $-OC_{12}H_{25}$ | Ib | • 50.8 | — | — | — | — | — | • | |
| 10 | " | " | $CH_3$ $O$<br>$\mid$ $\parallel$<br>$C_6H_{13}CHOC-$<br>$*$ | $-OC_5H_{11}$ | Ib | • 99.3 | (• 96.1) | — | • 108.0 | • 112.5 | — | • | |
| 11 | " | " | " | $-OC_8H_{17}$ | Ib | • 110.9 | — | — | (• 109.3) | — | — | • | Ex- |
| 12 | " | " | " | $-OC_{12}H_{25}$ | Ib | • 102.4 | — | — | (• 101.9) | — | — | • | am- |
| 13 | " | $-OCO-$ | $C_8H_{17}O-$ | $CH_3$<br>$\mid$<br>$-OCHC_8H_{13}$<br>$*$ | Ic | • 90.0 | — | — | (• 83.6) | — | •88.5) | • | ple 2 |
| 14 | " | " | $CH_3$<br>$\mid$<br>$C_6H_{13}CHO-$ | $-OC_3H_{17}$ | Id | • 68.8 | — | — | (• 61.4) | — | ○63.5) | • | |
| 15 | " | " | " | $-C_9H_{19}$ | Id | • 72.6 | — | — | (• 66.2) | — | ○67.3) | • | |
| 16 | " | " | $CH_3$ $O$<br>$\mid$ $\parallel$<br>$C_6H_{13}CHOC-$<br>$*$ | $-OC_8H_{17}$ | Id | • 46.9 | — | (• 36.8) | • 67.0 | | •74.4- | • | |
| 17 | | " | | $-C_9H_{19}$ | Id | • 45.8 | — | • 49.5 | • 68.0 | | •78.1- | • | |

*¹ The symbol •below the column indicating the respective phases indicates that the compound exhibits the phase, and the numeral on the right side thereof indicates a transition point from the phase to the phase on the right side of the numeral

TABLE 2

| Test No.*¹ | Ps (nC/cm²) | Tilt angle (degree)*⁴ |
|---|---|---|
| 1 | ca. 1 | — |
| 2 | ca. 1 | — |
| 3 | ca. 1 | — |
| 4 | ca. 1 | — |
| 5 | 63.7 | 28.0 |
| 6 | 57.5 | 28.3 |
| 7 | 70.8*² | 32.8*² |
| 8 | 79.3*² | 37.3*² |
| 9 | 52.3 Extrapolation value*³ | — |
| 10 | 87.3 | 23.2 |
| 11 | 106.2*² | 31.1*² |
| 12 | ≧59*² | 32.0*² |
| 13 | 43.0*² | 43.0*² |
| 14 | 77.9 | 42.1 |
| 15 | 73.2 | 41.5 |
| 16 | 104.8 | 27.4 |
| 17 | 77.9 | 24.8 |

*¹Sample No. is the same as that in Table 1.
*²Value measured at a temperature 5° C. lower than the upper limit temperature of SC* phase. Other values were measured at a temperature 10° C. lower than that.
*³The extrapolation value refers to a value sought from Ps value measured in the form of a mixture thereof with other SC liquid crystal by extrapolation method.
*⁴The tilt angle refers to an angle of the normal to the layer of SC* phase made against the major axis of the molecule.

The compounds expressed by the formula (I) exhibit smectic C* phase in the form of a single substance, and among the compounds, those having an R* of 1-methylalkyl type exhibit much larger spontaneous polarization values (Ps) than those of so far known SC* phase compounds; hence the compounds of the formula (I) of the present invention can be said to be superior ferroelectric liquid crystal compounds. Some of the compounds of the formula (I) of the present invention have PS values amounting to 100 nC/cm² or more, whereas a known compound, e.g.

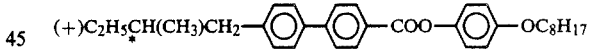

described in Japanese patent application laid-open No. Sho 53-22883/1978 (corresponding patents: U.S. Pat. No. 4,257,911; G.B. Pat. No. 1,592,161; DE Pat. No. 2,736,424) has a Ps value as small as about 1 nC/cm² according to the measurement of the present inventors; thus the Ps values of the present invention can be said to be surprisingly large.

Further, a superior specific feature of these substances is that the tilt angle of SC* phase is large. In the guest-host type light-switching element using a SC* liquid crystal composition shown in an Example described later, the tilt angle of SC* phase is ideally preferred to be 45°. Thus, such specific features indicate that the compounds of the present invention have much superior properties as a constituting component of SC* liquid crystal compositions for guest-host type light-switching elements.

Display elements exhibiting the light-switching effect of SC* phase have the following three superior specific features as compared with those of TN display mode:

The first specific feature is that the display elements reply at a very high rate so that the response time is 1/100 or less of those of conventional TN mode display elements. The second specific feature is that there is a memory effect so that the multiplex drive is easy in combination thereof with the above high rate response properties. The third specific feature is that when the gray scale is given in the case of TN display mode, this is effected by adjusting the impressed voltage, but there are raised difficult problems such as temperature dependency of threshold voltage, voltage dependency of response rate, etc.; whereas when the light-switching effect of SC* phase is applied, it is possible to readily obtain the gray scale by adjusting the reverse time of polarity and hence the display elements are very suitable to graphic display.

As to the display method, the following two may be considered:

One method is of birefringence type using two plates of polarizers and another is of guest-host type using a dichroic dyestuff. Since SC* phase has a spontaneous polarization, the molecule is reversed around the helical axis as a rotating axis by reversing the polarity of impressed voltage. When a liquid crystal composition having SC* phase is filled in a liquid crystal display cell subjected to aligning treatment so that the liquid crystal molecules can be aligned in parallel to the electrode surface, followed by placing the liquid crystal cell between two plates of polarizers arranged so that the direct of the liquid crystal molecules can be in parallel to the polarization plane on one side, impressing a voltage and reversing the polarity, then a bright field of view and a dark field of view are obtained depending on the opposition angle of the polarizers. On the other hand, in the case of operation by way of the guest-host type, it is possible to obtain a bright field of view and a colored field of view (depending on the arrangement of the polarization plate), by reversing the polarity of impressed voltage.

In general, it is difficult to align liquid crystal molecules in parallel to the wall surface of a glass plate in the smectic state thereof; hence liquid crystal molecules have been aligned by very slowly cooling the molecules starting from the isotropic liquid thereof (1° C.~2° C./hr) in a magnetic field of several tens gausses or more. But, in the case of a liquid crystal substance exhibiting the cholesteric phase thereof in a temperature range higher than the temperature at which the smectic phase is exhibited, it is possible to easily obtain a uniformly aligned monodomain state, by cooling the molecules from the temperature at which the cholesteric phase thereof is exhibited, down to the temperature at which the smectic phase is exhibited, at a cooling rate of 1° C./min., while impressing a direct current voltage of 50 to 100 V in place of the magnetic field.

In addition, racemic form compounds corresponding to the compound of the formula (I) may be similarly prepared by replacing the optically active alcohol used as a raw material in the preparation of the optically active substance (I), as shown below, by racemic form alcohols corresponding thereto, and the resulting racemic form compounds exhibit almost the same phase transition points as those in the case of (I), although they exhibit non-chiral liquid crystal phase.

Further, since the compound of the formula (I) contains an optically active carbon atom, it has a capability of inducing a twisted structure when added to a nematic liquid crystal. A nematic liquid crystal having a twisted structure, i.e. a chiral nematic liquid crystal, does not form the so-called reverse domain of TN type display elements; hence it is possible to use the compound of the formula (I) as an agent for preventing the reverse domain from forming.

In addition, among the raw material optically active 2-alkanols used in the preparation of the compound of the present invention, as described below, S(+)-2-octanol, R(−)-2-octanol and S(−)-2-methylbutanol are readily commercially available, but other optically active 2-alkanols are at present unsuitable for use in a large quantity. The present inventors used as raw material, products obtained by subjecting racemic substances to optical resolution according to the description of the literature (R. H. Pickard et al, J. Chem. Soc., 99, 45 (1911)), and by using the thus obtained optically active 2-alkanols, it is possible to obtain various compounds of the formula (I) having different kinds of $R^1$ and $R^2$. However, change in the liquid crystal phase transition points depending on the chain lengths of $R^1$ and $R^2$ is slight; hence it is preferred to use as raw material, optically active 2-octanol and 2-methylbutanol, but it is also possible in principle to use other optically active alkanols.

(Preparation of the compound)

Compounds of the formula (I) wherein $X=-CH_2O-$ and $Y=-COO-$, i.e. those of formulas (Ia) and (Ib), may be prepared through the following route:

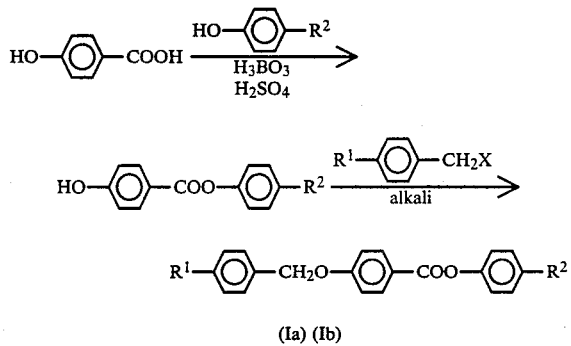

(Ia) (Ib)

Further, the above compounds may also be prepared through the following route; the number of steps of this process is more than that of the above process, but this process is easier:

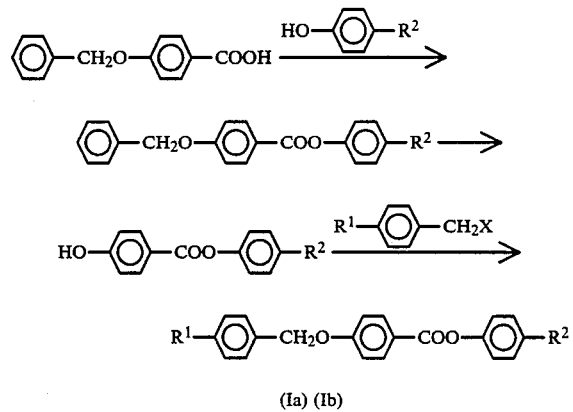

(Ia) (Ib)

Compounds of the formula (I) wherein $X=-CH_2O-$ and $Y=-OCO$, i.e. those of formulas (Ic) and (Id), may be prepared through the following route:

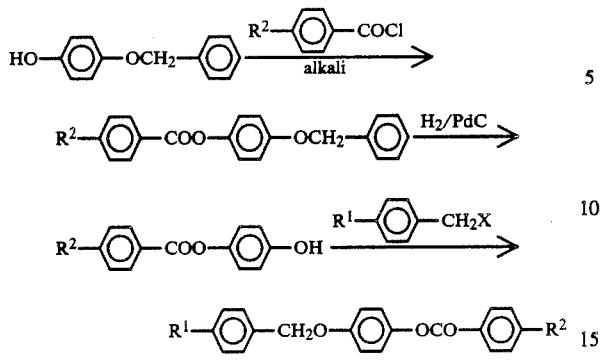

(Ic) (Id)

Compounds of the formula (I) wherein X=—OCH$_2$— and Y=—COO—, i.e. those of formulas (Ie) and (If), may be prepared through the following route:

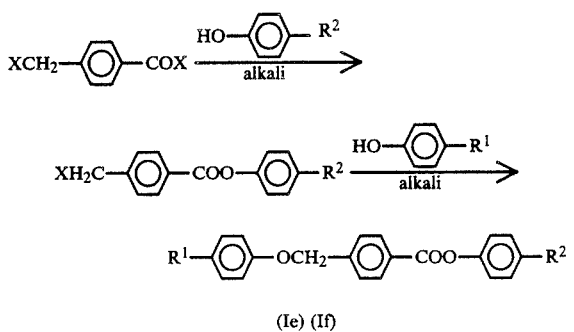

(Ie) (If)

Compounds of the formula (I) wherein X=—OCH$_2$— and Y=—OCO—, i.e. those of formulas (Ig) and (Ih), may be prepared through the following route:

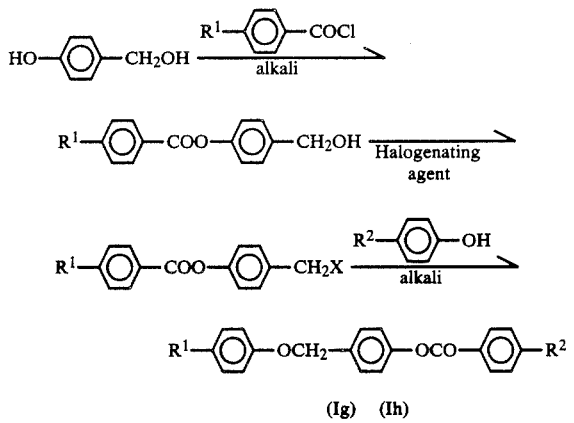

(Ig) (Ih)

The optically active ester liquid crystal compounds of the present invention will be described in more detail by way of Examples.

As the optically active alcohols used as raw material in the following Examples, only those of S type are used, but even when those of R type are used as raw material, the resulting compounds have the same phase transition points as those in the case of S type. This is theoretically natural, but the angle of rotation, the helical twist sense and the sense of spontaneous polarization of the compounds of R type are contrary to those of S type.

EXAMPLE 1

Preparation of optically active p-(p'-decyloxybenzyloxy)benzoic acid-p-(1-methyl-heptyloxy)phenyl ester (a compound of the formula (I) wherein X=—CH$_2$O—, Y=—COO—, R$^1$=C$_{10}$H$_{21}$O— and $$R^2 = -O\overset{*}{C}HC_6H_{13};$$
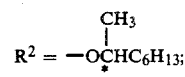

sample No. 5)

(i) Preparation of optically active p-toluenesulfonic acid 1-methylheptyl ester

S(+)-2-octanol (200 g, 1.536 mol) was dissolved in dry pyridine (600 ml), followed by dropwise adding to the solution, a solution of p-toluenesulfonic acid chloride (292.8 g, 1.536 mol) dissolved in dry toluene (440 ml), while keeping the temperature inside the system so that it might not exceed 10° C., thereafter agitating the mixture at room temperature for one hour, increasing the temperature inside the system to 50° C., keeping the temperature for 2 hours, thereafter cooling, further adding water (1 l) and toluene (500 ml), agitating the mixture, wahsing the separated toluene layer with 6N-HCl, further with 2N-NaOH aqueous solution and further with water until the wash water became neutral, and distilling off toluene to obtain as residue, optically active p-toluenesulfonic acid 1-methyl-heptyl ester (321.0 g).

(ii) Preparation of p-benzyloxybenzoic acid chloride

Thionyl chloride (63.1 g, 0.53 mol) was added to p-benzyloxybenzoic acid (100.0 g, 0.44 mol), followed by refluxing the mixture for about 2 hours, and completely removing excess thionyl chloride by distillation under reduced pressure to obtain p-benzyloxybenzoic acid chloride (63.4 g).

(iii) Preparation of optically active p-(1-methylheptyloxy)phenol

To hydroquinone monobenzyl ether (200.0 g, 1.00 mol) were added ethanol (1,000 ml), p-toluenesulfonic acid 1-methyl-heptyl ester (212.0 g, 1.10 mol) prepared above in (i) and a solution of NaOH (48.0 g, 1.20 mol) dissolved in water (50.0 g), followed by refluxing the mixture for about 10 hours, distilling off ethanol, adding to the residue, 6N-HCl (400 ml) and toluene (500 ml), agitating the mixture, washing the toluene layer with 6N-HCl, then with 2N-NaOH aqueous solution and further with water until the wash water became neutral, drying the toluene layer, distilling off toluene, subjecting the residue to column chromatography with activated alumina (200 g), dissolving the residue in ethanol (200 ml), reducing it in the presence of 5% Pd/C (10.0 g) to obtain raw optically active p-(1-methyl-heptyloxy)phenol, and distilling the raw product under reduced pressure to obtain optically active p-(1-methyl-heptyloxy)phenol (142.4 g, 1.5 mm Hg 132° C.).

(iv) Preparation of optically active p-benzyloxybenzoic acid p-(1-methyl-heptyloxy)phenyl ester Optically active p-(1-methyl-heptyloxy)phenol (50.0 g, 0.22 mol) was dissolved in pyridine (300 ml), followed by dropwise adding to the solution, a solution of p-benzyloxybenzoic acid chloride (50.0 g, 0.20 mol) prepared above in (ii), dissolved in toluene (300 ml), under ice cooling, agitating the mixture for 2 hours while keeping it at about 50°~60° C., allowing it to stand overnight, thereafter adding toluene (1,500 ml) and water (1,000 ml), agitating the mixture, washing the toluene layer with 6N-HCl, then with 2N-NaOH aqueous solution and further with water until the wash water became neutral, distilling off toluene, and recrystallizing the residue from ethanol to obtain optically active p-benzyloxybenzoic acid p-(1-methyl-heptyloxy)phenyl ester (69.0 g).

(v) Preparation of optically active p-hydroxybenzoic acid p-(1-methyl-heptyloxy)phenyl ester Optically active p-benzyloxybenzoic acid p-(1-methylheptyloxy)phenyl ester (69.0 g, 0.16 mol) prepared above in (iv) was dissolved in a mixed solvent (2:1) (1,000 ml) of ethyl acetate-ethanol, followed by reducing it in the presence of 5% PdC (5.0 g) to obtain optically active p-hydroxybenzoic acid p-(1-methyl-heptyloxy)phenyl ester (49.8 g).

(vi) Preparation of captioned compound

50% Hydrogenated sodium (1.6 g, 0.07 mol) was decanted a few times with n-heptane (50 ml) followed by dropwise adding thereto optically active p-hydroxybenzoic acid p-(1-methyl-heptyloxy)phenyl ester (10 g, 0.03 mol) prepared above in (v), adding DMSO (50 ml) after completion of hydrogen evolution, dropwise adding to the mixture a solution of p-decyloxybenzyl chloride (8.3 g, 0.03 mol) dissolved in THF (50 ml), further adding DMSO (50 ml), agitating the mixture at room temperature for 1~2 hours, subjecting it to extraction with toluene, washing with 6N-HCl, then with 2N-NaOH aqueous solution and further with water until the wash water became neutral, distilling off toluene and recrystallizing the residue from ethanol or ethyl acetate to obtain optically active p-(p'-decyloxybenzyloxy)benzoic acid p-(1-methyl-heptyloxy)phenyl ester (7.2 g). The phase transition points of this product were as follows:

C-SC* point 85.9° C., SC*-I point 105.3° C.

By replacing p-decyloxybenzyl chloride used above by optically active p-alkylbenzyl chlorides, optically active p-alkyloxybenzyl chlorides or optically active p-alkyloxycarbonylbenzyl chloride, and by replacing optically active p-(1-methyl-heptyloxy)phenol by non-optically-active p-alkylphenols or p-alkyloxyphenols, compounds of formula (Ib) are obtained.

EXAMPLE 2

Preparation of optically active p-(1-methyl-heptyloxyl)benzoic acid p-(p'-octyloxybenzyloxy)phenyl ester (a compound of the formula (I) wherein X=—CH$_2$O— Y=—OCO—, R$^1$=C$_8$H$_{17}$O— and

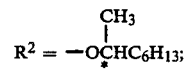

Sample No. 13)

(i) Preparation of optically active p-(1-methylheptyloxy)benzoic acid

Methyl p-hydroxybenzoate ester (177.0 g, 1.16 mol) was dissolved in methanol (800 ml), followed by adding KOH (65.0 g, 1.16 mol), adding after completion of heat generation, optically active p-toluenesulfonic acid 1-methyl-heptyl ester (300.0 g, 1.06 mol) prepared in advance, refluxing the mixture for about 4 hours, allowing it to stand at room temperature, thereafter adding water (1 l) and toluene (500 ml), agitating the mixture, washing the separated toluene layer sufficiently with 2N-NaOH aqueous solution and further with water until the wash water became neutral, distilling off toluene, dissolving the residue in ethanol (50 ml), adding a solution of NaOH (30.0 g) dissolved in water (150 ml), refluxing the mixture for about one hour, thereafter acidifying the reaction product with hydrochloric acid, filtering deposited crystals and recrystallizing from heptane to obtain optically active p-(1-methyl-heptyloxy)benzoic acid (96.2 g).

(ii) Preparation of optically active p-(1-methylheptyloxy)benzoic acid chloride

Thionyl chloride (51.2 g, 0.43 mol) was added to optically active p-(1-methyl-heptyloxy)benzoic acid (90.0 g, 0.36 mol), followed by refluxing the mixture for about 2 hours, thereafter completely removing excess thionyl chloride by distillation under reduced pressure to obtain optically active p-(1-methyl-heptyloxy)benzoic acid chloride (90.0 g).

(iii) Preparation of p-(1-methyl-heptyloxy)benzoic acid p-benzyloxyphenyl ester

Hydroquinone monobenzyl ether (100.0 g, 0.50 mol) was dissolved in pyridine (600 ml), followed by dropwise adding to the solution, a solution of p-(1-methylheptyloxy)benzoic acid chloride (122.2 g, 0.45 mol) dissolved in toluene (600 ml), under ice cooling, agitating the mixture for 2 hours while keeping the temperature at about 50°-60° C., allowing it to stand overnight, thereafter adding toluene (3,000 ml) and water (2,000 ml), agitating the mixture, washing the toluene layer with 6N-HCl, then with 2N-NaOH aqueous solution and further with water until the wash water became neutral, distilling off toluene and recrystallizing the residue from ethanol to obtain p-(1-methyl-heptyloxy)-benzoic acid p-benzyloxyphenyl ester (121.0 g).

(iv) Preparation of p-[p'-(1-methyl-heptyloxy)benzoyloxy]phenol

Optically active p-(1-methyl-heptyloxy)benzoic acid p-benzyloxyphenyl ester (69.0 g, 0.16 mol) was dissolved in a mixed solvent (1,000 ml) of ethyl acetate-ethanol (2:1), followed by reducing it in the presence of 5% Pd/C (5.0 g) to obtain optically active p-[p'-(1-methyl-heptyloxy)benzoyloxy]phenol (47.6 g).

(v) Preparation of captioned compound

50% Hydrogenated sodium (1.6 g, 0.07 mol) was decanted a few times with n-heptane (50 ml), followed by dropwise adding thereto optically active p-[p'-(1-methyl-heptyloxy)benzoyloxy]phenol (10 g, 0.03 mol), adding DMSO (50 ml) after completion of hydrogen evolution, dropwise adding a solution of p-octyloxybenzyl chloride (7.6 g, 0.03 mol) dissolved in THF (50 ml), further adding DMSO (50 ml), agitating the mixture at room temperature for 1-2 hours, subjecting it to extraction with toluene, washing with 6N-HCl, then with 2N-NaOH aqueous solution and further with water until the wash water became neutral, distilling off toluene, and recrystallizing the residue from ethanol or ethyl acetate to obtain optically active p-(1-methyl-heptyloxy)benzoic acid p-(p'-octyloxybenzyloxy)phenyl ester (7.6 g).

The phase transition points were as follows:
C-I point 90.0° C., I-Ch point 88.5° C., Ch-SC* point 83.6° C.

By replacing p-octyloxybenzyl chloride used herein by optically active p-alkylbenzyl chlorides, optically active p-alkyloxybenzyl chlorides or optically active p-alkyloxycarbonylbenzyl chlorides, and by replacing optically active p-(1-methyl-heptyloxy)phenol by non-optically-active p-alkylphenols or p-alkyloxyphenols, compounds of formula (Id) are obtained.

EXAMPLE 3 (COMPOSITION EXAMPLE 1)

A nematic liquid crystal composition consisting of

| | |
|---|---|
| C₂H₅—⟨O⟩—⟨O⟩—CN | 20 wt. % |
| C₅H₁₁—⟨O⟩—⟨O⟩—CN | 40 wt. % |
| C₈H₁₇O—⟨O⟩—⟨O⟩—CN | 25 wt. % |
| C₅H₁₁—⟨O⟩—⟨O⟩—⟨O⟩—CN | 15 wt. % | was sealed in a cell provided with transparent electrodes, subjected to a parallel aligning treatment by applying polyvinyl alcohol (PVA) as an aligning agent onto the surface, and rubbing the resulting surface and having a distance between the electrodes of 10 μm, to prepare a TN type display cell, which was then observed with a polarizing microscope. As a result, a reverse twist domain was observed to be formed.

Then the compound of sample No. 1 of the present invention, i.e.

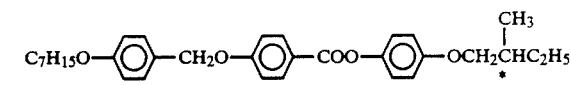

was added in a quantity of 1% by weight to the above nematic liquid crystal composition and the resulting composition was observed in the same TN cell. As a result, the reverse twist domain disappeared and a uniform nematic phase was observed.

EXAMPLE 4 (COMPOSITION EXAMPLE 2)

The following liquid crystal composition containing as one component thereof, the optically active liquid crystal compound of sample No. 17 in the above Table 1 was prepared:

| | |
|---|---|
| C₈H₁₇—⟨O⟩—CO—⟨O⟩—OCH₂C*HC₂H₅ with CH₃ | 30 wt. % |
| C₉H₁₉O—⟨O⟩—CO—⟨O⟩—OCH₂C*HC₂H₅ with CH₃ | 30 wt. % |
| C₇H₁₅O—⟨O⟩—CO—⟨O⟩—⟨O⟩—OCH₂C*HC₂H₅ with CH₃ | 20 wt. % |
| C₆H₁₃C*HOC—⟨O⟩—CH₂O—⟨O⟩—OC—⟨O⟩—C₉H₁₉ with CH₃ | 20 wt. % |
| (No. 17) | |

Preparation of the composition was carried out by weighing the above four liquid crystal compounds in definite quantities, respectively, and blending them in a sample bottle while dissolving them on heating.

The resulting composition was filled in a cell provided with transparent electrodes, subjected to a parallel aligning treatment by applying PVA as an aligning agent onto the surface, and rubbing the resulting surface and having a distance between the electrodes of 2 μm. The resulting liquid crystal element was set between two crossed polarizers and an electric field was impressed. As a result, change in the intensity of transmitted light was observed by impression of 20 V.

In addition, response time was sought from the change in the intensity of transmitted light at that time, to exhibit a value of about 1 msec at 25° C.

Further, with the above liquid crystal composition, change in the texture with temperature was examined by means of a polarizing microscope. As a result, it was seen that a ferroelectric liquid crystal was formed in a temperature range of 18° to 55° C. The value of its spontaneous polarization was 10 nC/cm² at 25° C. and the tilt angle was 24°.

EXAMPLE 5 (COMPOSITION EXAMPLE 3)

The following liquid crystal composition containing as components thereof, optically active compounds of sample Nos. 13, 14 and 15 in the above Table 1 was prepared in the same manner as in Example 4:

C8H17OCO—⟨O⟩—⟨O⟩—OCH2CH(CH3)C2H5*   20 wt. %

C9H19OCO—⟨O⟩—⟨O⟩—OCH2CH(CH3)C2H5*   20 wt. %

C8H17O—⟨O⟩—CH2O—⟨O⟩—OC(=O)—⟨O⟩—OCH(CH3)C6H13*   20 wt. %

(No. 13)

C6H13CH(CH3)O*—⟨O⟩—CH2O—⟨O⟩—OC(=O)—⟨O⟩—OC8H17   20 wt. %

(No. 14)

C6H13CH(CH3)O*—⟨O⟩—CH2O—⟨O⟩—OC(=O)—⟨O⟩—C9H19   20 wt. %

(No. 15)

An anthraquinone dyestuff (D-16, tradename of product made by BDH Company) as a dichroic dyestuff was added to the above composition to prepare a composition of the socalled guest-host type, which was then filled in the same cell as in Example 4 (but cell thickness: 10 μm), and a polarizer was provided so that the polarization plane might be parallel to the molecular axis. An electric field was impressed onto the cell. As a result, by impression of 40 V, change in the intensity of transmitted light was observed.

Response time was sought from the change in the transmitted light at that time to exhibit a value of about 2 msec at 25° C.

In addition, with the above liquid crystal composition, temperature change in the texture thereof was observed by means of a polarizing microscope. As a result, it was seen that a ferroelectric liquid crystal was formed in the temperature range of 15° C. to 65° C. The value of its spontaneous polarization was 20 nC/cm² and the tilt angle was 37°.

What we claim is:

1. An optically active liquid crystal compound expressed by the formula

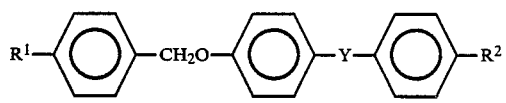

wherein Y represents —COO— or —OCO—; and either one of $R^1$ or $R^2$ represents an optically active 1-methylheptyloxy group, 1-methylheptyloxycarbonyl group or 2-methylbutyloxy group, and the other represents a non-optically active alkyl group or alkoxy group each of 5 to 12 carbon atoms.

2. An optically active liquid crystal compound according to claim 1 wherein said optically active group is the optically active 1-methylheptyloxy group.

3. An optically active liquid crystal compound according to claim 1 wherein said optically active group is the optically active 1-methylheptyloxycarbonyl group.

4. An optically active liquid crystal compound according to claim 1 wherein said optically active group is the 2-methylbutyloxy group.

5. A liquid crystal composition having at least two components at least one of which is an optically active liquid crystal compound as set forth in claim 1 and exhibiting a chiral smectic C phase.

6. An optically active liquid crystal compound according to claim 1, expressed by the formula

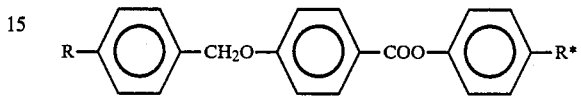

wherein R represents a non-optically active alkyl group or alkoxy group each of 5 to 12 carbon atoms, and R* represents an optically active 1-methylheptyloxy group, 1-methylheptyloxycarbonyl group or 2-methylbutyloxy group.

7. An optically active liquid crystal compound according to claim 1, expressed by the formula

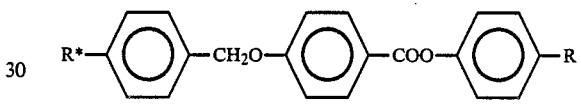

wherein R represents a non-optically active alkyl group or alkoxy group each of 5 to 12 carbon atoms, and R* represents an optically active 1-methylheptyloxy group, 1-methylheptyloxycarbonyl group or 2-methylbutyloxy group.

8. An optically active liquid crystal compound according to claim 1, expressed by the formula

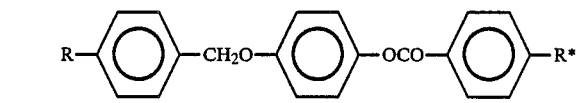

wherein R represents a non-optically active alkyl group or alkoxy group each of 5 to 12 carbon atoms, and R* represents an optically active 1-methylheptyloxy group, 1-methylheptyloxycarbonyl group or 2-methylbutyloxy group.

9. An optically active liquid crystal compound according to claim 1, expressed by the formula

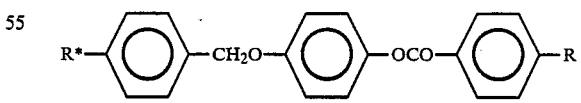

wherein R represents a non-optically active alkyl group or alkoxy group each of 5 to 12 carbon atoms, and R* represents an optically active 1-methylheptyloxy group, 1-methylheptyloxycarbonyl group or 2-methylbutyloxy group.

10. A light switching element comprising a chiral smectic C liquid crystal composition according to claim 5.

* * * * *

UNITED STATES PATENT AND TRADEMARK OFFICE
CERTIFICATE OF CORRECTION

PATENT NO. : 4,729,847

DATED : March 8, 1988

INVENTOR(S) : Kazutoshi Miyazawa; Hiromichi Inoue; Takashi Inukai; and Kanetsugu Terashima It is certified that error appears in the above-identified patent and that said Letters Patent is hereby corrected as shown below:

In TABLE 1 bridging columns 1-2, in the far right column under "Note", delete "Example 1";

In TABLE 1 bridging columns 3-4, in the far right column under "Note", in the first line insert --Example 1-- for Sample No. 5; and In column 12, the formula at lines 20-23, change "$C_8H_{17}$" at the far left side of the formula to --$C_8H_{17}O$--.

Signed and Sealed this

Twenty-fifth Day of October, 1988

Attest:

DONALD J. QUIGG

*Attesting Officer*   *Commissioner of Patents and Trademarks*